United States Patent Office 3,338,851
Patented Aug. 29, 1967

3,338,851
TRIAZINE HYDROXYMETHANE SULPHONATE ACCELERATOR FOR AMINOPLASTIC MOLDING COMPOSITIONS
William Gordon Keith Taylor, West Hagley, Anthony Harold Page, Birmingham, and Corwyn Philip Vale, Brierley Hills, England, assignors to British Industrial Plastics Limited, London, England, a corporation of the United Kingdom
No Drawing. Filed Aug. 11, 1964, Ser. No. 388,935
Claims priority, application Great Britain, Aug. 13, 1963, 32,022/63
10 Claims. (Cl. 260—15)

ABSTRACT OF THE DISCLOSURE

Urea and melamine formaldehyde resins are moulded employing melamine-hydroxymethane sulphonate or benzoguanamine hydroxymethane sulphonate as an accelerator. Inert fillers can also be added.

---

The present invention is concerned with aminoplastic moulding compositions and particularly with accelerators for such compositions.

Hot press moulding compositions containing an aminoplastic resin and an inert filler have been well-known commercially for a number of years. It is also well known that such compositions require the addition of acidic or potentially acidic substances to accelerate the curing process so that articles may be moulded rapidly and economically. An ideal accelerator would be a compound which is completely inert at temperatures below about 150° F. but which at moulding temperatures (i.e. 260–340° F.), produces acidity rapidly and efficiently. Such a compound would provide a very rapid cure, and at the same time would enable the moulding composition to be stored indefinitely under normal temperature conditions without loss of flow in the mould. The compounds proposed as accelerators in the present invention approach this ideal to a considerable extent.

According to the present invention a hot press moulding composition comprises an aminoplastic resin, an inert filler and a triazine hydroxymethane sulphonate as accelerator.

The triazine hydroxymethane sulphonates suitable for use in the present invention may be prepared by the methods described in U.K. patent specification No. 885,-529, particularly suitable compounds being melamine hydroxymethane sulphonates and benzoguanamine hydroxymethane sulphonate.

Normally the amount of accelerator used is from 0.1–5.0% based on the dry weight of the moulding composition, and preferably it is from 0.25 to 2.5%.

The accelerators of the present invention are especially useful for translucent mouldings, a higher translucency of moulding being obtainable with these accelerators than with other known accelerators.

Although it is possible to incorporate the accelerators at the "wet mix" stage of the preparation of aminoplastic moulding materials (i.e. when the product is in a resinous state before drying), it is advantageous to incorporate them at the ball-mill or "dry mix" stage (i.e., when the product is in the form of a powder). For example, in the case of urea-formaldehyde compositions, although the addition of the accelerator at the "wet-mix" stage results in extremely fast-curing moulding powders, their storage stability is relatively poor. However, if addition is made at the "dry mix" stage, fast-curing products, which have good storage stability, are obtained.

In the case of melamine-formaldehyde moulding powders it is customary to introduce the accelerator at the ball-milling stage on account of the ease with which melamine-formaldehyde resins condense under acid conditions.

The inert filler in the moulding composition of the present invention may be of any known or customary type. For instance organic fillers, such as cellulose, regenerated cellulose, cellulose esters, and cellulose ethers in substantially purified form or as a natural cellulose product or residue, such as wood flour and sisal, and inorganic fillers, such as asbestos, silica, talc, asbestine, china clay and glass fibers are suitable. There may also be included in the moulding composition, without detriment, various additives such as mould lubricants, stabilisers and pigments.

The following examples are given for the purpose of illustrating the invention, the parts referred to being parts by weight.

Example 1

An aqueous urea-formaldehyde precondensate was prepared by dissolving 800 parts urea in 1622 parts neutral formalin (37% formaldehyde w/w). The solution was heated to 60° C. and held at this temperature for 30 minutes. The syrup was filtered, cooled and mixed with 660 parts alpha cellulose in a Werner-Pfleiderer type mixer until a fine, homogeneous crumb was obtained. The wet crumb was transferred to trays which were then placed in a thermostatically controlled oven fitted with an air-circulating fan. The mixture was dried out at 80° C. until just dry to the touch and brittle, and the dry material was divided into five equal portions. Each portion was ball-milled with 0.5% hexamine, 0.5% zinc stearate (both based on the weight of the dry material) and an accelerator. The fine powders obtained were hot granulated in a conventional manner and then moulded at 302° F. and about 2 ton per sq. inch pressure in a bottle-cap mould.

Table 1 below gives the accelerator used and the minimum cure times required to make a blister free moulding and the storage life of the moulding material at 100° F., in each of the five cases.

| Accelerator | Minimum cure time (seconds) | Storage life (days) |
|---|---|---|
| 1. 0.5% ethylene sulphite. (British Patent Specification No. 866,440). | 27 | About 10. |
| 2. 1.0% melamine hydroxymethane sulphonate. | 31 | Greater than 40. |
| 3. 1.5% melamine hydroxymethane sulphonate. | 21 | About 22. |
| 4. 1.0% benzoguanamine hydroxymethane sulphonate. | 27 | Greater than 40. |
| 5. 1.5% benzoguanamine hydroxymethane sulphonate. | 20 | About 16. |

Example 2

948 parts melamine, 1219 parts neutralised 37% (w/w) formalin (pH 7.0 to 7.5) and 433 parts water were heated together with stirring. At 80° C. the melamine rapidly dissolved and the clear solution obtained was maintined at this temperature until one drop placed in a large volume of ice-cold water gave a cloud of hydrophobe resin. The solution was cooled to 60° C. and mixed in a Werner-Pfleiderer type mixer with 660 parts alpha cellulose pulp until a homogeneous wet crumb was obtained. This was transferred to trays and oven-dried at 80° C. until brittle. The dried material was divided into seven portions, to each of six of which were added 0.5% (based on the dry material) zinc stearate and an accelerator. The seven materials were then moulded at 302° F. and about 2 tons per sq. inch pressure in a bottle-cap mould.

Table 2 below gives the accelerator used and the minimum cure times required to make a blister free moulding and the storage life of the moulding material at 100° F. in each of the seven cases.

| Accelerator | Minimum cure time (seconds) | Storage life at 100° F. (weeks) |
|---|---|---|
| 1. None | 125 | Greater than 15. |
| 2. 0.5% melamine hydroxymethane sulphonate. | 85 | Do. |
| 3. 1.0% melamine hydroxymethane sulphonate. | 65 | Do. |
| 4. 1.5% melamine hydroxymethane sulphonate. | 16 | Do. |
| 5. 0.5% benzoguanamine hydroxymethane sulphonate. | 70 | Do. |
| 6. 1.0% benzoguanamine hydroxymethane sulphonate. | 35 | Do. |
| 7. 1.5% benzoguanamine hydroxymethane sulphonate. | 14 | Do. |

What is claimed is:

1. A hot press moulding composition comprising an aminoplastic resin selected from the group consisting of urea-formaldehyde resins and melamine-formaldehyde resins, an inert filler and a sulphonate selected from the group consisting of melamine-hydroxymethane sulphonate and benzoguanamine hydroxymethane sulphonate in an amount of 0.1 to 5.0%, based on the dry weight of the total composition.

2. A hot press moulding composition according to claim 1 wherein the sulphonate is melamine hydroxymethane sulphonate.

3. A hot press moulding composition according to claim 1 wherein the sulphonate is benzoguanamine hydroxymethane sulphonate.

4. A composition according to claim 1 wherein said sulphonate is employed in an amount of 0.25 to 2.5% and is melamine-hydroxymethane sulphonate.

5. A composition according to claim 1 wherein said sulphonate is employed in an amount of 0.25 to 2.5% and is benzoguanamine hydroxymethane sulphonate.

6. A hot press moulding composition according to claim 1 wherein the inert filler is a compound selected from the group consisting of cellulose, regenerated cellulose, a cellulose ester, a cellulose ether, asbestos, silica, talc, asbestine, china clay and glass fibre.

7. A hot press moulding composition according to claim 1 which also contains a mould lubricant.

8. A hot press moulding composition according to claim 1 which also contains a stabiliser.

9. A hot press moulding composition according to claim 1 which also contains a pigment.

10. A method for preparing a hot press moulding composition comprising mixing an aminoplastic resin selected from the group consisting of urea formaldehyde resins and melamine formaldehyde resins with an inert filler to obtain a fine homogeneous crumb, drying the wet crumb, and ball-milling the dried crumb with a triazine hydroxymethane sulphonate selected from the group consisting of melaminehydroxymethane sulphonate and benzoguanamine hydroxymethane sulphonate, in an amount of 0.1 to 5.0% based on the dry weight of the total composition.

No references cited.

WILLIAM H. SHORT, *Primary Examiner.*

E. M. WOODBERRY, *Assistant Examiner.*